May 25, 1954  J. E. WHITFIELD  2,679,412

SEAL

Filed March 24, 1950

INVENTOR.
JOSEPH E. WHITFIELD
BY
*Otto Moeller*
Attorney

Patented May 25, 1954

2,679,412

UNITED STATES PATENT OFFICE 2,679,412

SEAL

Joseph E. Whitfield, Erie, Pa., assignor to Read Standard Corporation, a corporation of Delaware Application March 24, 1950, Serial No. 151,769

1 Claim. (Cl. 286—8)

This invention relates generally to sealing devices and more particularly to a face type lubricated seal for the shaft of an impeller of a pump, compressor, blower or the like.

One of the primary objects of the present invention is to provide a relatively simple but highly effective seal of the type described that is more compact than previously known seals of this type, and more particularly that takes up a minimum of space lengthwise of the shaft.

Another object of the invention is to provide a seal of the type described in which the various elements of the seal are readily assembled in a container that can be conveniently inserted or removed as a unit.

Figure 1:
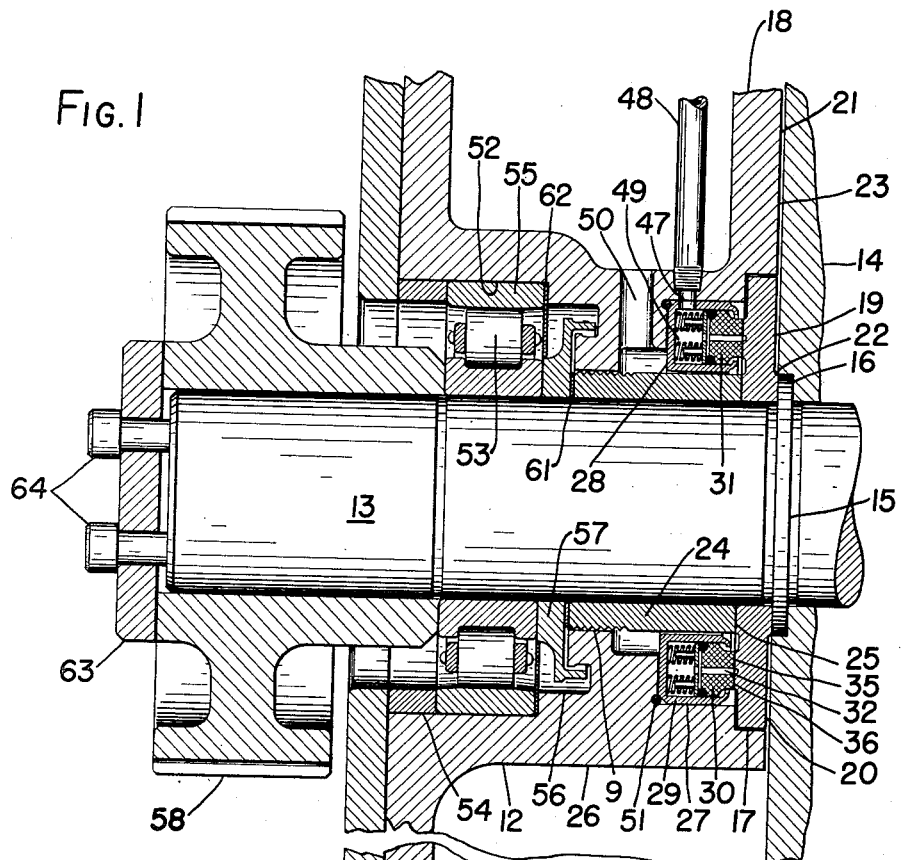
Figure 2:
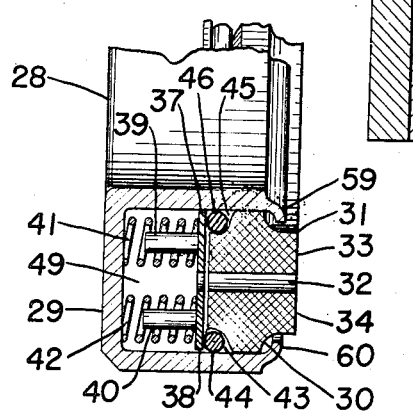

Other features and advantages of the invention will become apparent from the following description, reference being had to the accompanying drawing wherein:

Figure 1 is a fragmentary longitudinal section through one of the bearing ends for the shaft of an impeller member and having the present invention embodied therewith; and Figure 2 is a fragmentary sectional view of the seal shown in Figure 1 with parts shown in elevation.

The invention is particularly adapted to a fluid device of the rotary screw type such as is shown in my United States Letters Patent No. 2,287,716, granted June 23, 1942. For purpose of illustration, the invention is shown as applied to one of the bearing ends of a rotor shaft of a device of the type described in the aforesaid patent. It is apparent, however, that the invention is of wide application wherever a tight seal for a shaft is desired.

Referring to the drawing, the numeral 10 designates the rotor housing of a fluid device and an end cover therefor is shown at 11. Supported in the rotor housing 10 adjacent the end cover 11 is a bearing housing 12 for one end of the shaft 13 of a rotor 14. The bearing carrier 12 has a bore 9 of greater diameter than the shaft 13.

The shaft 13 is provided with an annular flange 15 that forms a positioning stop for the rotor 14 to properly locate the rotor 14 between the ends of shaft 13. The end face of the rotor 14 is preferably provided with a counter-bore 16 in which the flange 15 is received. While the flange 15 is shown integrally formed with the shaft 13, it may be formed as a separable member and secured on the shaft in any suitable manner. In fact, where the opposite end of shaft 13 is provided with a similar seal, one or the other of the flanges is, as a practical matter, made separable in order to permit assembly of the rotor 14 on shaft 13.

Pressed on the shaft 13 and arranged to be received in an annular recess 17 in the inner wall 18 of the bearing housing 12, is an annular sealing plate 19. A running clearance is provided between the surfaces defining the recess 17 and the adjacent surfaces of the plate 19. The recess 17 is coaxial with respect to the bore 9 but of greater diameter. The inner face 20 of the plate 19 is preferably arranged to be flush with the inner face 21 of inner wall 18 of the bearing housing 12. An annular boss 22 formed with and projecting from the inner face 20 of the plate 19 registers with and fits against the outer face of the flange 15. The boss 22 provides for a running clearance 23 between the end face of the rotor 14 and the inner face 21 of inner wall 18 of the bearing housing 12. The contacting surfaces of the boss 22 and flange 15 are very accurately machined to retain the plate 19 in a perfect perpendicular plane with respect to the axis of the shaft 13.

A spacer collar 24 fits closely about the shaft 13 and has an outside diameter closely fitting the wall of the bore 9. The inner end of the collar 24 abuts and registers with an annular boss 25 on the outer face of the plate 19. In order to insure perfect positioning of the plate 19 in a perpendicular plane with respect to the axis of shaft 13, the adjacent surfaces of collar 24 and boss 25 are accurately machined.

Formed in the annular wall 26 of the bearing housing 12 and opening to the recess 17 is an annular recess 27. The recess 27, which is less in diameter than the recess 17 but greater than the diameter of bore 9 surrounds the inner end of the spacer collar 24. A sealing device designated generally by the reference character 28, which cooperates with the sealing plate 19, is mounted in the recess 27.

The sealing device 28 comprises an annularly shaped container or cartridge 29, the radially outer annular wall of which has a press fit in the recess 27 and the radially inner annular wall of which has a running clearance with respect to the spacer collar 24. One side of the container 29, that side facing the plate 19, is open.

Partially enclosed within the open sided portion of the container 29 are a pair of concentric sealing members 30 and 31, fitting respectively, closely against the outer and inner annular walls of the container 29. The sealing members 30 and 31 which are formed of carbon or other suitable material are spaced apart radially to provide an annular passage 32 therebetween for a purpose to be described.

The sealing members 30 and 31 are provided with reduced nose pieces 33 and 34, respectively, projecting through the open side of the container 29. The radial end surfaces of the projecting nose pieces 33 and 34 are ground and lapped so as to be perfectly smooth and are arranged to fit against and register with similarly ground and lapped surfaces of annular bosses 35 and 36 on the outer face of the plate 19 to provide a fluid tight seal.

Suitable means is provided for independently biasing the sealing members 30 and 31 toward the plate 19. Disposed within the container 29 adjacent the ends of the sealing members 30 and 31, respectively, are the concentric annular radially spaced washers 37 and 38. The washers 37 and 38 are provided, respectively, with a plurality of annularly arranged, preferably equidistantly spaced pins 39 and 40, extending outwardly of the face of the washers 37 and 38 for supporting the springs 41 and 42, respectively.

The radially outer peripheral edge of sealing member 30 is cut away to provide an annular recess 43 between the sealing member 30 and the radially outer annular wall of the container 29 in which is disposed an annular sealing ring 44 made of a suitable deformable material. A portion of the sealing ring 44 extends axially beyond the outer end face of the sealing member 30, which portion is contacted by the washer 38. The pressure of springs 42 against the washer 38 effect deformation of the sealing ring 44 to provide a fluid tight seal between the sealing member 30 and the outer wall of the container 29. In a similar manner, the radially inner peripheral edge of sealing member 31 is cut away to provide an annular recess 45 to receive the annular sealing ring 46, deformation of which by the springs 41 and washer 37 effects a fluid tight seal between the sealing member 31 and the inner wall of the container 29.

A passage 47 extending through the annular wall 26 of bearing housing 12 and the radially outer wall of the container 29 provides for admission of lubricating oil from a supply pipe 48 to the lubricant chamber 49 of the container 29. Lubricant from the chamber 49 passes through passage 32, and by capillary action the lubricant reaches the adjacent sealing surfaces between the stationary sealing members 30 and 31 and the rotating plate 19 providing lubrication therefor.

A vent 50 communicates with the recess 27 in which the sealing device 28 is mounted, whereby any trace of fluid that may leak past the sealing device 28 is vented. As an added precaution against leakage between the container 29 and the walls defining the recess 27, a deformable sealing ring 51 is disposed therebetween.

The end of the bearing housing 12 opposite that which embraces the sealing device 28 is provided with an annular recess 52 arranged to receive a roller bearing 53 for the shaft 13. A spacer ring 54 and end cover 11 securely retain the outer race 55 of the bearing 53 in place in the recess 52. A recess 56 adjacent and of lesser diameter than recess 52 houses an oil slinging disc 57.

Mounted on the outer end of shaft 13 is a gear 58. While the gear 58 is shown as one of a pair of timing gears for a blower of the type shown in my aforementioned Patent No. 2,287,716, it is apparent that depending on the type of device to which the seal is applied, the gear 58 may be omitted or the shaft may be arranged to be driven from the end shown.

Referring now to the method of assembling the various components, the sealing device 28 is first assembled as a unit. The springs 41, 42, washers 37, 38, sealing rings 44, 46 and sealing members 30, 31 are inserted in the container 29 after which the flanges 59, 60 of the container 29 are bent inwardly to retain the various parts in place. In the drawing the flanges 59, 60 are shown in their inwardly bent position. Other suitable means may, of course, be employed to retain the various elements in the container 29.

After the sealing device 28 has been assembled, the sealing ring 51 is inserted in the recess 27 of the bearing housing 12 and then the sealing device 28 is pressed into the recess 27. Before inserting the shaft 13 in the bearing housing 12, the rotor 14 is mounted on the shaft 13 and its proper position is determined by the flange 15 of shaft 13. The sealing plate 19 is then slipped over the shaft 13 against the flange 15 and the spacer collar 24 is next slipped on the shaft against the plate 19. This shaft assembly is then inserted in the bearing housing 12. In order then, the shim 61 and oil slinger 57 are slipped over the shaft 13 and inserted into the bearing carrier until they abut the end of the spacer collar 24. A sealing disc 62 is next inserted in the recess 52 followed by the outer race 55 of bearing 53 and spacer 54, and these elements are held in place in the recess 52 by end cover 11. Now the inner race and roller of the bearing 53 can be slipped over the shaft 13 and inserted in the bearing housing 12, after which the gear 58 is mounted on the end of the shaft 13.

The hub of the gear 58 is arranged to project beyond the end of the shaft 13 after the various elements described have been assembled. A clamp plate 63 fits over the projecting end of the hub of gear 58 and is secured to the shaft 13 by means of cap screws 64. Thus by drawing up tightly on the cap screws 64 it is apparent that the plate 19, collar 24, shim 61, slinger 57, the inner race of bearing 53 and gear 58 are tightly clamped between the flange 15 and the clamp plate 63, so that these parts will rotate with the shaft 13.

A passage (not shown) similar to passage 47 extending through the annular wall 26 and the radially outer wall of the container 29 may be provided, preferably diametrically opposite passage 47, from which the lubricant can be drained or piped back to the source of supply to effect a circulating system providing for cooling of the sealing means. While the preferred lubricating and cooling medium is oil, water may be employed since it will provide lubrication between the sealing surfaces of the stationary sealing members 30 and 31 and the rotating plate 19.

The lubricated seal described above and shown in the drawing is illustrative of a preferred embodiment of the invention, and it is to be understood that the device is capable of alteration without departing from the spirit of the invention.

I claim:

A lubricated face type sealing device for effecting a seal between a shaft and a housing therefor, said device comprising, an annular plate fixed to said shaft for rotation therewith, said plate having a radially disposed sealing surface, an annular container mounted in said housing in surrounding relation with respect to said shaft, said container being open at one side facing the sealing surface of said plate, a pair of concentric annular sealing rings in said container spaced apart to provide an annular passage therebetween, said sealing rings being disposed with one of their ends projecting through the open end of said container and having at that end radially disposed sealing surfaces abutting on the adjacent sealing surface of said annular plate, the abutting areas of said sealing ring sealing surfaces and plate sealing surface being imperforate throughout to provide uninterrupted frictional contact therebetween, means in said container for independently biasing each of said sealing rings in sealing engagement with said plate, and means for supplying a flowable lubricant to said container whereby lubricant will pass through said annular passage to the edges of said sealing surfaces for lubricating the frictionally contacting sealing surfaces of said sealing rings and said plate, means for effecting a seal between said sealing rings and said container, said means including annular recesses formed in the peripheral edge of said sealing rings opposite their sealing surfaces adjacent the sides of said container, deformable O-rings in said recesses of greater diameter than the depth of said recesses, and washers between said biasing means and said O-rings for compressing said O-rings against the inner wall of said container and against said sealing rings to maintain a seal therebetween.

References Cited in the file of this patent

UNITED STATES PATENTS

| Number | Name | Date |
|---|---|---|
| 1,859,436 | Durdin | May 24, 1932 |
| 2,109,679 | Neveling | Mar. 1, 1938 |
| 2,362,436 | Stratford | Nov. 7, 1944 |
| 2,393,260 | Pardee | Jan. 22, 1946 |
| 2,531,079 | Payne | Nov. 21, 1950 |

FOREIGN PATENTS

| Number | Country | Date |
|---|---|---|
| 323,365 | Great Britain | of 1930 |